Jan. 22, 1963   I. W. AXHELM   3,075,067
BUILD-UP AND HARD SURFACING MACHINE
Filed March 30, 1961   3 Sheets-Sheet 1

INVENTOR.
Ivey W. Axhelm
BY Scott L. Norvell
atty

Jan. 22, 1963　　　I. W. AXHELM　　　3,075,067
BUILD-UP AND HARD SURFACING MACHINE
Filed March 30, 1961　　　　　　　　　　　　　　3 Sheets-Sheet 2

INVENTOR.
Ivey W. Axhelm
BY Scott L. Norviel
Atty

Jan. 22, 1963    I. W. AXHELM    3,075,067
BUILD-UP AND HARD SURFACING MACHINE
Filed March 30, 1961    3 Sheets-Sheet 3

INVENTOR.
Ivey W. Axhelm
BY Scott L. Norvell
atty.

3,075,067
BUILD-UP AND HARD SURFACING MACHINE
Ivey W. Axhelm, 5613 S. 27 Place, Phoenix, Ariz.
Filed Mar. 30, 1961, Ser. No. 99,517
3 Claims. (Cl. 219—76)

This invention concerns hard surfacing machines for rock crusher rolls.

It is known to the art that crusher rolls of various kinds handling hard rocks wear rapidly even though made of wear resistant steel alloys. Heretofore there has been some activity in resurfacing the worn surfaces of these rolls by using electric arc welding of various types. The present device concerns improvements in the machine to handle the arc weld material and the mechanism by which it is applied.

One of the objects of the invention is to provide a hard surface welding machine which will handle a continuous electrode and apply the electrode to the worn surface of the roll in a series of evenly spaced rings.

A second object is to provide a welding apparatus which is controlled by the rotation of the rolls and which will apply a series of weld beads each surrounding and filling in the surface of the rolls to form a new wear surface which will replace the surface worn away; said beads being laid on the surface of the rolls or on the surface provided by former circular beads in such a way as to form a new wear matrix and said operation being controlled by the rotary operation of the rolls so as to be automatic.

Still another object is to provide automatic mechanism for feeding welding rod onto a crusher roller so as to make a continuous weld that will leave a smooth hard surface on the worn roller and will operate itself when once set into operation.

Still another object is to provide a device, as above described, wherein rings or circles of weld material are laid on the worn portions of the roll in accurate rings; each ring being abutted against the adjacent ring and said weld laid down one length at a time; the apparatus then being moved so as to lay down the next weld bead as a ring.

Still another object is to provide a means for holding back or breaking the rotation of the rolls while the bead is being applied and for maintaining an electrical contact with the body of the roll during the process of welding.

Other objects will appear hereinafter.

I attain the foregoing objects by means of the devices, parts and combinations of parts shown in the accompanying drawings, in which FIGURE 1 is a plan view of a pair of rollers with the improved apparatus incorporating my invention applied thereto;

Similar numerals refer to similar parts in the several views.

Figure 1:
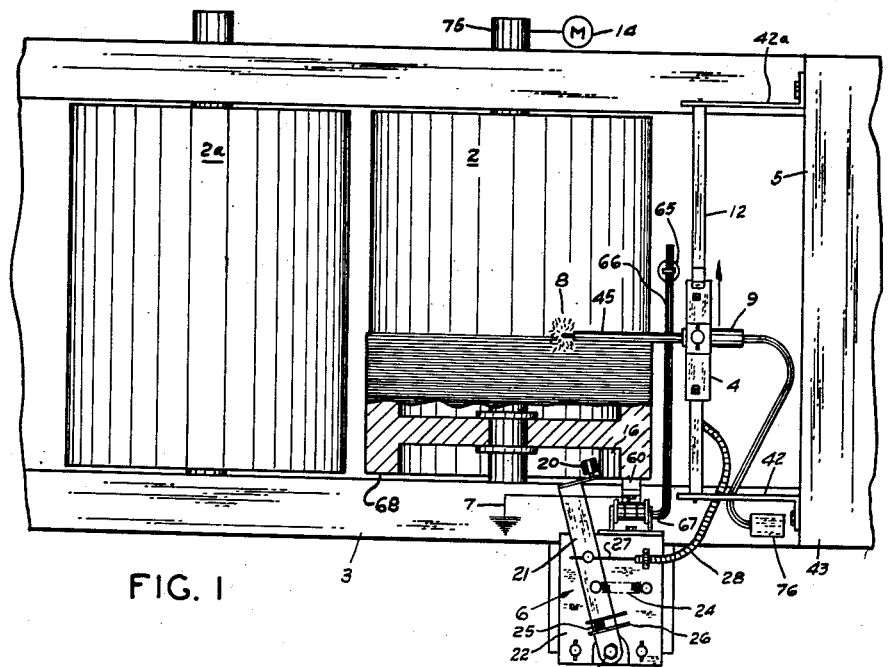
Figure 2:
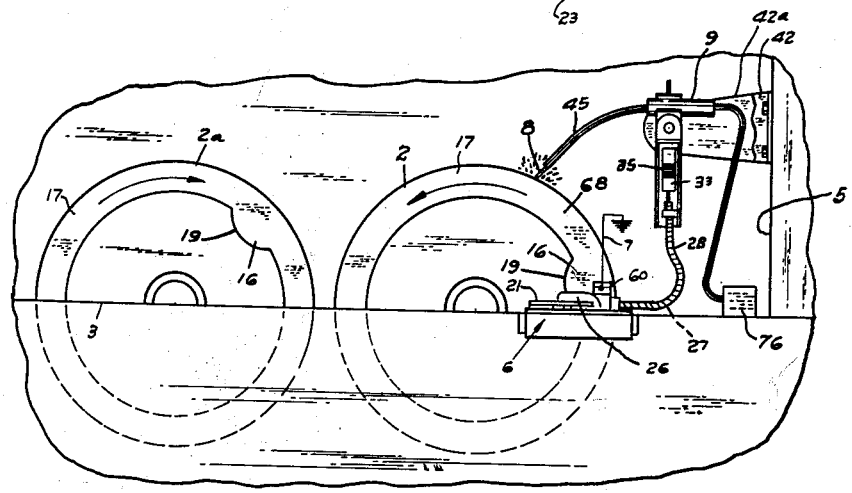
FIGURE 2 is a side elevational view of the said rolls and apparatus.

In FIGURES 1 and 2 the assembly is shown which consists of a rock crushing roller to be surfaced, marked 2, mounted in a frame 3, and having the weld rod holder 4 attached to vertical portions 5 of the frame and the intermittent transverse feed mechanism 6 mounted on one side of a side member of frame 3. It is to be understood that welding current is furnished to the welding material rod 8 which is fed from a large supply roll, indicated diagrammatically at 76, and that flux is contained within the welding rod as a core. The manner in which the rod is fed through the rod holder 9 and guide sheath 45 is shown but it is to be understood that any standard roll mechanism known to the art may be used to advance the rod as it is applied. Since this invention concerns the manner of applying the rod the rod feeding apparatus is not a part of the invention. More particularly, the invention here concerned concerns the positioning of the live end of the welding rod with reference to the surface of the roller being worked.

The rod and sheath holder 9 is held on a carriage 10. This carriage operates in a direction parallel to the axis of roller 2 on slide bar 12. The roller 2 is rotated by any desired means such as the motor 14 which may be applied to roller shaft 75 independently of the principal drive gears ordinarily used to rotate the rollers. Each of the two rollers 2 and 2a is provided with an arcuate cam 16 on the inner surface of the end portion of its annular body part 17. These cams are attached to it in any convenient manner as by weld-tacking or brazing. Each cam has a semi-cylindrical or arcuate outer surface 19 which is disposed to contact roller 20 supported on feed arm 21.

Feed arm 21 is pivoted at its inner end to base plate 22 by a pivot bearing bolt 23. It is held to the hand limit of its movement (FIGURE 1) by a spring 24 attached to plate 22 and is guided against and held against upward displacement by a roller 25, supported by bracket 26.

Figures 3, 5:
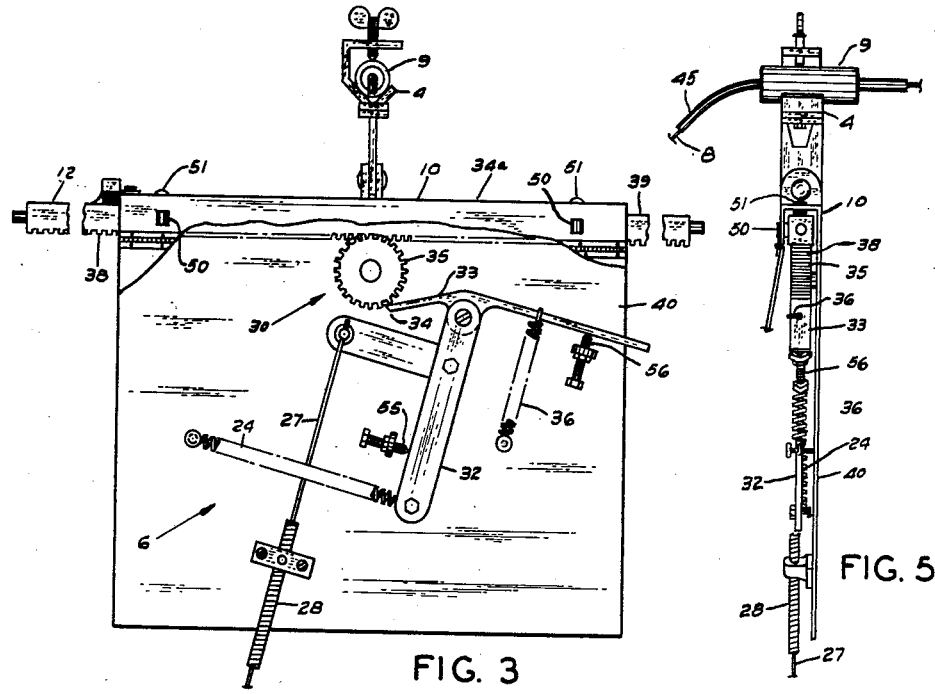
FIGURE 3 is a plan view of the welding rod holder, drawn on a somewhat enlarged scale.
FIGURE 5 is a side edge elevational view thereof.

As the crusher roller 2 rotates, the cam 16 on the inner annular surface 20 at the end of roller 2 causes feed arm 21 to oscillate and this operates the stiff steel wire 27 contained within the flexible tubular guide sheathing 28, and slides it in and out of the sheathing 28 and at the other end of the wire causes it to operate pawl lever 32 of ratchet mechanism generally indicated by numeral 30 (see FIGURE 3).

This ratchet mechanism consists of the pawl lever 32 which carries a pawl 33, and ratchet wheel 35. The engaging end 34 of the pawl 33 engages teeth in ratchet wheel 35 when held against the ratchet wheel 35 by spring 36. The stop 56 limits pivotal motion of pawl 33 and therefore limits the ratcheting action of wheel 35.

The teeth of ratchet wheel 35 mesh with rack teeth 38 of slide bar 12. This rack is a square bar which slidably holds base plate 40 of carriage 10. Slide bar 12 is supported by brackets 42 and 42a, and these are, in turn, attached to portions 43 of crusher base frame 3. The brackets 42 and 42a position slide bar 12 so that the carriage 4 and welding rod holder 9 move parallel to the axis of roller 2 while the holder 9 supports the rod 8 and sheathing 45 above and adjacent to the periphery of crusher roller 2.

Each time roller 20 contacts cam 16 the ratchet mechanism 30, above described, operates and advances the carriage base 40 carrying the rod holder 9, so that the rod end 8 moves a predetermined distance along the face of roller 2.

It is noted that the rod holder 9, as shown in FIG-

Figure 4:
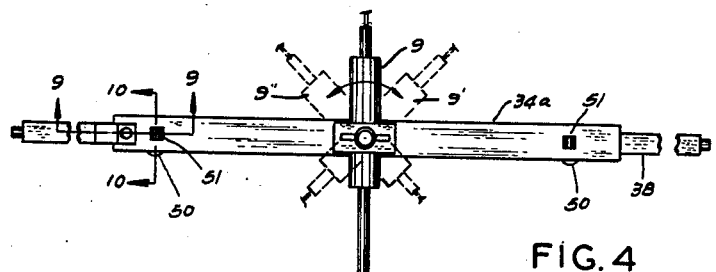
FIGURE 4 is a top plan view thereof.
Figures 9, 10:
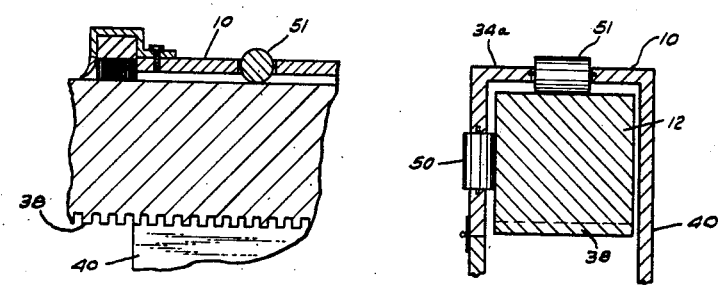
FIGURE 9 is a sectional view looking in the direction of arrows 9—9 on FIG. 4.
FIGURE 10 is a sectional view looking in the direction of the arrows 10—10 on FIG. 4.
Figures 6, 7, 8:
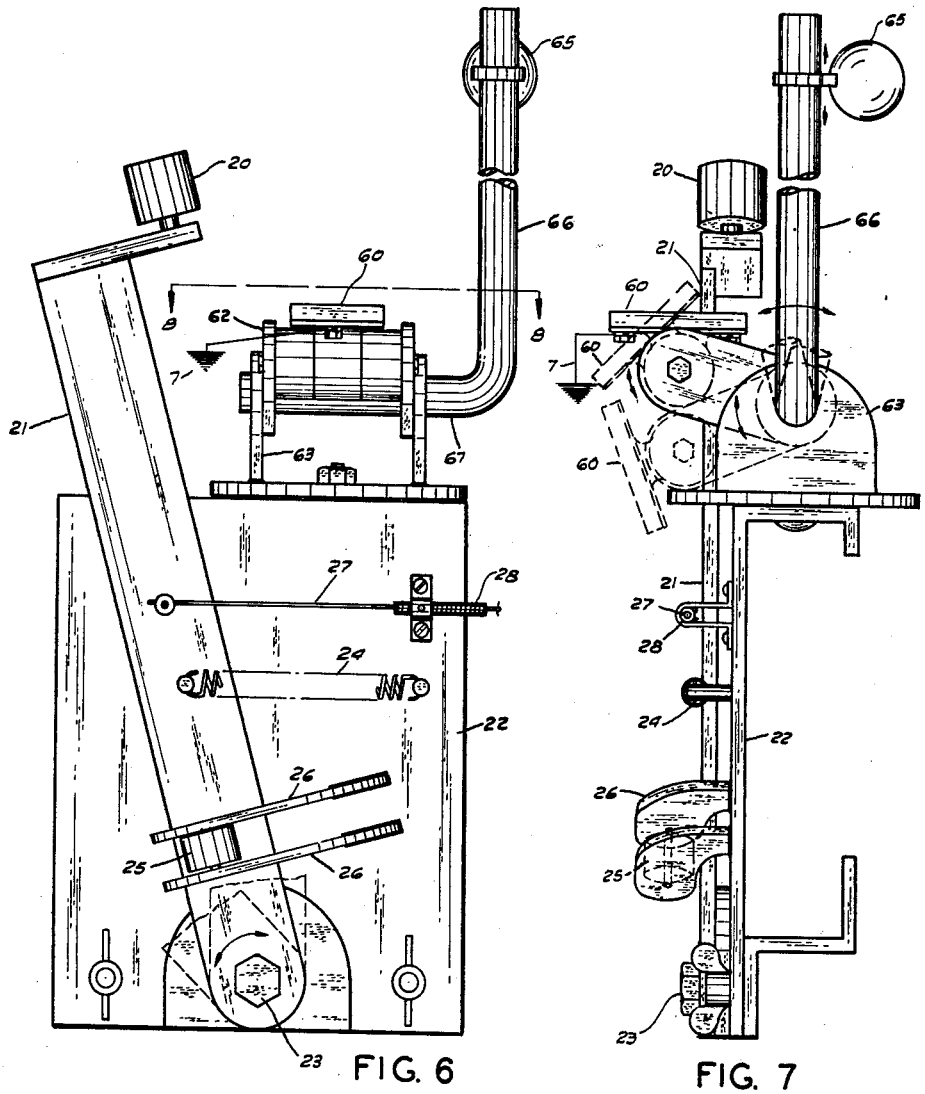
FIGURE 6 is a plan view of the mechanism for controlling the rotation of the roll and maintaining electric contact therewith and for intermittently moving the position of the weld rod holder so that it advances across the surface of the roll as the welding proceeds.
FIGURE 7 is a side edge view thereof.
FIGURE 8 is an elevational view of the contact shoe for maintaining electrical contact with the roll being surfaced; said section being taken substantially on line 8—8 of FIGURE 6.

URE 4, is attached to slide top 34a so that the holder may be set at an angle desired, as indicated by dotted lines 9' and 9", of FIGURE 4. Friction between the carriage slide top and side part 34a and the bar 12 is minimized by anti-friction rollers 50 and 51, as shown in FIGURES 9 and 10.

The distance moved by the base 40 by each operation of the wire 27 is regulated by adjustment of stops 55 and 56.

In order to maintain good electrical contact between the body of roller 2 and the ground cable 7, I provide the copper shoe 60 which is pivotally mounted on crank arm 62 on bracket 63 and which is attached to the base plate 22 of feed mechanism 6.

A weight 65 is placed at the outer end of the crank and lever arm 66 and this tends to rotate shaft 67 which supports the shoe 60. Since the shoe is supported in an eccentric position relative to the axis of shaft 67 the weight urges the shoe into contact with the edge surface 68 of roll 2. This provides a smooth uniform contact at all times. The shoe is connected directly to cable 7 leading to the ground side of the electrical mechanism supplying electric energy to the welding rod above described.

The same mechanism is applied to cooperating crushing roller 2a, when and as desired.

I claim:

1. In hard surfacing mechanism for a rock crusher roller supported on a shaft journalled in a base frame, said roller having an annular outer surface and an annular flange at one end and having an inner surface, a cam attached to the annular inner surface of said flange, a base plate mounted on said base frame adjacent the end of said roller to which said cam is attached, a feed lever pivotally mounted at one of its ends on said base plate, a roller on the free end of said feed lever disposed to contact said cam on said flange during rotatation of said crusher roller, a slide bar having rack teeth on its lower side attached by brackets at each end to said base frame and disposed in spaced relation to the surface of said crusher roller and extending parallel to the axis of the roller shaft, a carriage including a carriage base plate slidably supported on said slide bar, a ratchet wheel operatively journalled on said carriage base plate and having teeth engaging the rack teeth on said slide bar, a pawl lever having a pivotally mounted ratchet at its free end engaging the teeth on said ratchet wheel, a wire slidably enclosed in a flexible sheath communicating oscillating motion from said feed lever to said pawl lever, a welding rod holder on said carriage having a guide tube, welding rod in said guide tube, means for feeding welding rod through the guide tube on said carriage, and means for rotating said crusher roller during welding, a combination brake and ground mounted on said base frame having a shoe frictionally bearing on the edge of said flange on said roller; said brake and ground and said welding rod being adapted to be included in an electric arc welding circuit.

2. In hard surfacing mechanism for a rock crusher roller supported on a shaft journalled in a base frame, said roller having an annular outer surface and an annular inner surface within a recess at one end, a cam attached to said annular inner surface of said roller, a base plate mounted on said base frame adjacent the end of said roller to which said cam is attached, a feed lever pivotally mounted at one end on said base plate, a roller on the free end of said feed lever disposed to contact said cam during rotation of said crusher roller, a spring operating between said plate and said feed lever to resiliently maintain said roller in contact with the annular surface of said roller and said cam, a slide bar having rack teeth on its lower side attached at each of its ends to said base frame and disposed in spaced relation to the surface of said crusher roller and extending parallel to the axis of the crusher roller shaft, a carriage including a carriage base plate slidably supported on said slide bar, a ratchet wheel operatively journalled on said carriage base plate and having teeth engaging the rack teeth on said slide bar, a pawl lever having a pivotally mounted ratchet lever at its free end engaging the teeth on said ratchet wheel, a wire slidably enclosed in a flexible sheath communicating oscillating motion from said feed lever to said pawl lever, a welding rod holder on said carriage, welding rod on said welding rod holder, means for feeding welding rod through said holder tube on said carriage, and means for rotating said crusher roller to produce a hard surface bead in spiral form on the outer annular surface of said crusher roller, as said roller is rotated while said carriage moves said welding rod across the face of said roller in a direction parallel with the roller axis, and a combination brake and ground having a grounded shoe yieldably contacting the end of said roller, said rod and ground being adapted to be included with a source of electrical welding current connected therebetween.

3. A build-up surfacing machine for a rock crusher roller operating on a shaft journalled in a base frame, said roller having an annular outer surface and an annular inner surface within a recess at one end, a cam attached to said annular inner surface of said roller, a base plate mounted on said base frame adjacent the end of said roller to which said cam is attached, a feed lever pivotally mounted at one end on said base plate, a roller on the free end of said feed lever disposed to contact said cam during rotation of said crusher roller, a spring operating between said plate and said feed lever to resiliently maintain said roller in contact with the annular surface of said roller and said cam, a slide bar having rack teeth on its lower side attached at each end to said base frame and disposed in spaced relation to the surface of said crusher roller and extending parallel to the axis of the crusher roller shaft, a carriage including a carriage base plate, slidably supported on said slide bar, a ratchet wheel operatively journalled on said carriage base plate and having teeth engaging the rack teeth on said slide bar, a pawl lever having a pivotally mounted ratchet lever at its free end engaging the teeth on said ratchet wheel, a stiff wire enclosed in a flexible sheath connected at one end to said feed lever and to a pawl lever at the other end for communicating oscillating motion from said feed lever to said pawl lever to move said carriage along said slide bar, a welding rod holder tube on said carriage, means for feeding said welding rod through said holder tube on said carriage, a contact and brake shoe bearing on the end portion of said roller, mounted on a crank arm pivoted on said base frame, an eccentrically disposed weight connected to said crank arm to maintain said shoe yieldably in contact with said roller, and a means for rotating said crusher roller to produce a parallel form hard surface bead on the outer annular surface of said crusher roller; and a means for including said ground contact brake shoe and welding rod carriage in circuit with a source of electric welding current.

References Cited in the file of this patent

UNITED STATES PATENTS

| | | |
|---|---|---|
| 2,868,165 | Altman | Jan. 13, 1959 |
| 2,914,651 | Ackerman | Nov. 24, 1959 |